United States Patent [19]

Drake et al.

[11] Patent Number: 4,475,594

[45] Date of Patent: Oct. 9, 1984

[54] PLUGGING WELLBORES

[75] Inventors: Evelyn N. Drake, Plainfield; Peter Calcavecchio, Lodi, both of N.J.

[73] Assignee: Exxon Research & Engineering Co., Florham Park, N.J.

[21] Appl. No.: 392,722

[22] Filed: Jun. 28, 1982

[51] Int. Cl.³ .......................... C08K 5/01; C08K 5/34; C08L 23/00; E21B 33/138

[52] U.S. Cl. ...................................... 166/294; 175/72; 252/8.5 A; 252/8.5 P; 252/8.5 LC; 523/130

[58] Field of Search ............... 166/292, 293, 294, 274, 166/270, 295; 252/8.5 C, 8.5 M, 8.5 P, 8.5 LC; 175/72; 523/130

[56] References Cited

U.S. PATENT DOCUMENTS

| | | | |
|---|---|---|---|
| 2,836,555 | 5/1958 | Armentrout | 252/8.5 P |
| 2,890,169 | 6/1959 | Prokop | 252/8.5 P |
| 3,082,823 | 3/1963 | Hoover | 166/294 |
| 3,172,892 | 3/1965 | Le Suer et al. | 260/326.5 |
| 3,275,075 | 9/1966 | Gogarty et al. | 166/274 |
| 3,448,800 | 6/1969 | Parker et al. | 166/294 |
| 3,909,421 | 9/1975 | Gaddis | 252/8.55 D |
| 4,128,598 | 12/1978 | Makino et al. | 525/502 |
| 4,173,540 | 11/1979 | Lonstrup et al. | 252/49.6 |
| 4,391,925 | 7/1983 | Mintz et al. | 166/270 X |
| 4,397,354 | 8/1983 | Dawson et al. | 166/294 |

FOREIGN PATENT DOCUMENTS

WO81/00850  4/1981  PCT Int'l Appl. ................ 166/293

Primary Examiner—Stephen J. Novosad
Attorney, Agent, or Firm—Edward M. Corcoran

[57] ABSTRACT

A process for plugging a porous area of well bore which comprises pumping a shear thickening composition into the well under conditions of low shear to the portion of the well bore desired to be plugged at which point subjected to high shear to form a paste which plugs or seals the porous area. The shear thickening composition comprises a water-in-oil emulsion having granular bentonite dispersed in the oily phase, said oily phase having both an oil soluble amine and a polyamine derivative surfactant dissolved therein. The aqueous phase will preferably comprises a polyacrylamide solution. This process may be used for plugging wells having depths in excess of 8,000 feet.

43 Claims, 1 Drawing Figure

Effect of Low Molecular Weight Amines on Low Shear Thickening Time of Well Control Fluid

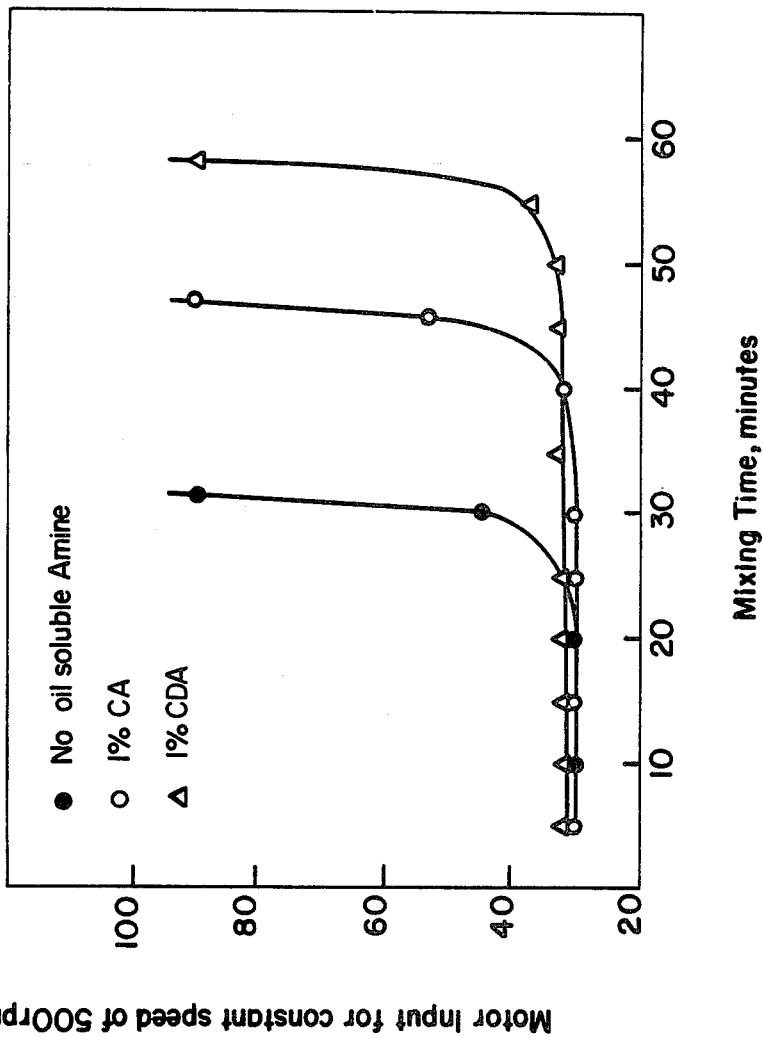

PLUGGING WELLBORES

BACKGROUND OF THE INVENTION

1. Field of the Invention

This invention relates to a process for plugging porous earth formations. More particularly this invention relates to plugging an underground formation penetrated by a well bore, by pumping a shear-thickening fluid down the well bore to the site of the formation desired to be plugged and subjecting the shear-thickening fluid to high shear which forms a stiff paste to plug said formation.

2. Background of the Disclosure

During the drilling and production of wells, such as oil, gas or water wells, various problems sometimes occur which, if not corrected, result in the loss of considerable well production and even loss of the well itself. These problems include blow-outs, lost circulation and channeling. Surface blow-outs occur when the drill bit cuts into a high pressure zone of gas, oil, or water which can blow out the drilling mud and sometimes even the drill stem, bit and surface equipment resulting in their loss and destruction also. Underground blow-outs occur when a fluid in one porous formation flows into the well bore and out of the well bore into another porous formation. Lost circulation of drilling mud occurs when the drill bit cuts through a porous formation at a pressure such that drilling mud coming down the drill stem flows into the porous structure instead of being forced back up to the surface between the drill stem and well casing. Channeling occurs when a fluid in one porous formation flows through continuous passages in cement behind well casing into another porous formation at a different depth in the well.

A number of methods and compositions have been employed in order to solve these problems, none of which has meet with complete success and, in fact, most have not been too successful. One method of trying to stop blow-outs involves loading up the well with a slurry of barite under pressure and under conditions such that the barite is able to settle uniformly at the bottom of the well to form a hard plug which may then be followed up with a cement slurry in order to make the plug more or less permanent. Various methods employed to stop lost circulation include slurries of barite along with fibrous, lumpy or flakey materials which it is hoped will ultimately form a filter cake and then a mat over the porous formation and thus plug it up. Another method used is to employ what is known as gunk which is a slurry of dry, powdered bentonite in diesel oil. When this material is mixed with the right amount of water, the bentonite will hydrate yielding a stiff paste. If formed at the right time and at the right place, this sometimes works as an effective lost circulation and well-plugging material. This type of material and method for its use is disclosed, for example, in U.S. Pat. No. 3,082,823. However, there are many problems associated with the use of this gunk. Among these problems is that the slurry must be kept dry until it reaches the desired formation in the well bore at which time it must be mixed with the proper amount of water in order to form a paste and an not emulsion or a slurry of hydrated bentonite.

U.S. Pat. No. 3,448,800 discloses a plugging method for restoring lost circulation in a well wherein a suspension or slurry of a particulate, water-soluble polymer in a non-aqueous medium is injected into a well. An aqueous slurry of a mineral material such as cement, barite or plaster of paris is separately injected into the well, with the two slurries meeting and mixing at the bottom of the well bore to form a plug at the area of lost circulation. U.S. Pat. No. 2,836,555 discloses a well plugging composition for restoring lost circulation in wells which comprises compressed, dehydrated pellets of bentonite encapsulated within a solid, water-insoluble polymeric coating which has a tiny hole drilled through the surface thereof. These pellets are pumped down into the well bore and, as they do so, water seeps into the hole in the coating into the bentonite thereby swelling and ultimately rupturing the coating. By proper design of the coating, etc., it is postulated that the pellets will rupture after they have become lodged in the lost circulation area to form a tight seal. U.S. Pat. No. 2,890,169 discloses another well control or lost circulation fluid which is made by forming a slurry of an organophilic bentonite and cement in oil. This slurry is mixed with a surfactant and water to form a composition comprising a water-in-oil emulsion having organophilic bentonite and cement dispersed in the continuous oil phase. As this composition is pumped down the well bore, the oil expands and flocculates the bentonite which, under the right conditions, forms a filter cake on the well-bore surface in the porous area. This is then supposed to cause a filtration action which breaks the emulsion causing the emulsified water to react with the cement to form a solid coating on the filter cake thereby plugging the porous area.

One of the problems encountered with the use of organophilic clays, such as bentonite clays treated with quaternary ammonium compounds having at least one alkyl, alkylene or alkylidine radical, is that oil rapidly expands and disperses the clay at low shear rates. These organic modified clays are prepared from bentonite-type clays that are normally hydrophillic in nature. A typical organic modified clay is dimethyldihydrogenated tallow ammonium bentonite. These clays are used mainly as oil viscosifiers and dispersion aids and are not used as the plugging component of well control fluids.

It is known to those in the art that if one can mix a hydrophilic or water expandable clay, such as bentonite, with the proper amount of water in the presence of a water-soluble polymer which will flocculate and congeal the clay, a much stronger and stiffer paste can be made than that which will occur if the bentonite is merely mixed with water. Thus, U.S. Pat. No. 3,909,421 discloses a high viscosity fluid useful in secondary oil recovery processes. This fluid is made by physically blending a dry powdered, polyacrylamide with bentonite followed by mixing the powder blend with water. U.S. Pat. No. 4,128,528 claims a powdered bentonite-polyacrylamide thickening composition prepared by mixing a water-in-oil emulsion with bentonite to form a damp, free-flowing powdered composition which rapidly forms a viscous, stiff material when mixed with water. The dispersed aqueous phase of the emulsion contains a water soluble surfactant along with a dispersion and/or solution of a water soluble polymer formed in-situ in the emulsion. The water-soluble polymer may be polyacrylamide or a copolymer of acrylamide and acrylic or methacrylic acid. This composition is taught as being useful for drilling muds, bases for earthen dams and clay cements.

Although many efforts have been made in an attempt to use bentonite-water systems with or without a water-soluble polymer which will flocculate and congeal the bentonite, one of the main problems has been to keep the bentonite away from the water until same reaches the desired part of the well-bore, which is usually at the bottom. Another problem has been making sure that the bentonite mixes with the proper amount of water to rapidly form a stiff paste or cement at the location of the problem in the well.

An attempt to overcome these difficulties has been made by dispersing bentonite into the continuous, oily phase of a water-in-oil emulsion formulated to have a proper balance of water and bentonite and also formulated to keep the bentonite and water apart until the dispersion is forced through the nozzles of the drill bit at the bottom of the well. Thus, copending application Ser. No. 400,526 filed on July 21, 1982 and U.S. Pat. Nos. 4,397,354 and 4,391,925 disclose shear thickening well control fluids which comprise bentonite dispersed in the continuous, oily phase of a water-in-oil emulsion. The oily phase contains a surfactant and the dispersed, aqueous phase may or may not contain a water-soluble polymer, such as a polyacrylamide, for congealing and flocculating the clay. These well control fluids have met with some success in solving some of the problems discussed above. However they cannot be used in deep wells, i.e., about 10,000 feet or more in depth, because as the emulsion is pumped down through the drill stem or drill pipe the clay particles slowly hydrate and break up causing the viscosity of the shear thickening composition to increase to a point requiring excessive pressure to pump same down the drill pipe. In some cases this viscosity increase will cause paste formation to occur in the drill pipe thereby plugging same. Ideally, these materials are pumped down the drill stem wherein the shear forces are relatively low and only when they are pumped out the holes of the drill bit will the relatively high shear forces developed by forcing the material through these relatively narrow openings break the emulsion and cause the water, polymer and bentonite to mix forming a relatively stiff paste substantially instantaneously. However, there is still a need for better well control fluids and particularly for well control fluids capable of being used in deep wells of 10,000 feet or more.

SUMMARY OF THE INVENTION

This invention relates to a process for plugging or sealing a porous earth formation which comprises contacting said porous formation with a shear thickening fluid or composition under conditions of shear sufficient to form a paste from the shear thickening composition which plugs or seals the porous formation. The shear thickening composition useful in the process of this invention comprises a water-in-oil emulsion having particles of hydrophilic, water swellable clay dispersed in the continuous, oily phase thereof, wherein said oily phase has both a surfactant and an oil soluble amine dissolved therein. The aqueous phase of the emulsion will preferably have dissolved therein a water soluble polymer, such as a polyacrylamide, for flocculating and congealing the clay when the emulsion is broken causing the clay to mix with the aqueous phase. This shear thickening composition is useful as a well control fluid, for forming earthen dams, for lining the bottom and sides of waste disposal sites against seapage, as a clay cement, etc.

This process may be employed to plug porous formations in deep wells having depths in excess of about 10,000 feet as well as in shallower wells. When used as a well control fluid, the shear thickening composition will be pumped down into the well through a conduit, such as drill pipe, until it reaches the portion of the well bore that is to be plugged. At that point it will be subject to conditions of relatively high shear to form a paste to plug the well bore. The high shear may be achieved by forcing the shear thickening composition through the holes of a drill bit at the end of the drill pipe.

BRIEF DESCRIPTION OF THE DRAWING

The attached FIGURE is a graph illustrating how the oil soluble amines increase the low shear thickening time of the shear thickening fluid useful in this invention.

DETAILED DESCRIPTION

By shear thickening composition is meant that the application of shear to the composition useful in the process of this invention will result in the formation of a sticky, rubber-like paste or solid, whose strength and integrity is a function of the intensity and duration of the shear forces employed as well as the particular formulation utilized. The greater the shear rate the faster the paste is formed and the stronger it will be. It should be noted that the water-in-oil emulsion portion of the composition useful in this invention of itself is extremely stable with a shelf life upwards of two or more years. However, when the clay is mixed or dispersed into the emulsion it slowly starts to adsorb water. Thus, if one mixes or disperses the clay into the emulsion very gently, using relatively low shear forces and then allows the so-formed composition of this invention to remain undisturbed, the clay will settle out on the bottom and slowly start to adsorb water and ultimately congeal. If sufficient time has elapsed and the settled clay starts to congeal, the shear force required to redisperse the clay will rapidly form a paste. Thus, it is preferred to use the composition of this invention as soon as possible after preparing same.

One can thus understand that the term "shear thickening" is a term of art and is difficult to quantify with precision. If one intends to use the process of this invention for well control, one may use low shear devices such as those normally used for mixing cement at a well site (i.e., for cementing behind well casing) to form the shear-thickening composition useful in this invention. Illustrative, but non-limiting examples of such devices include Halliburton ribbon or turbine blenders and cement mixers. One will then inject the so-formed composition down the drill pipe at a rate broadly ranging from about 0.1 to 10 barrels per minute (bpm) wherein it will be subject to relative low shear rates broadly ranging from less than about 1 to about 1,000 sec.$^{-1}$. Even under these conditions the viscosity of the composition slowly rises as the clay adsorbs water and slowly hydrates. However, some prehydration is desirable, because, all other things being equal, it will result in a stronger material formed by the high shear forces.

With the emulsion/clay dispersions of the prior art, it has been difficult to pump anything more than about 8,000–10,000 feet down the drill pipe without the composition starting to congeal and prematurely setting inside the pipe. The shear thickening composition useful in the process of this invention avoids this problem. However, when the composition of this invention is finally pumped through the holes or nozzles of the drill bit, it is subjected to high shear rates broadly ranging from about 2,000 to 1,000,000 sec.$^{-1}$, preferably 10,000 to 1,000,000 sec.$^{-1}$, which instantly forms a sticky, rubbery paste. The shear strength of this paste, as measured by the laboratory method set forth in the following two paragraphs, will be in excess of at least about 1,000 lbs/100 ft.$^2$, preferably 2,000 lbs/100 ft.$^2$ and still more preferably in excess of 3,000 lbs/100 ft.$^2$. The shear strength of the paste formed from the shear thickening fluid or composition is expressed in pounds per 100 ft.$^2$ as opposed to pounds per ft.$^2$, because 100 ft.$^2$ roughly corresponds to the internal area of a 90 ft. string of drill pipe having an inside diameter of about 4 inches.

In the laboratory, this shear strength may be determined by forming about 500 ml of the shear thickening fluid and then stirring the shear thickening fluid with an egg beater impeller, at a speed of about 500 rpm and a temperature of 120° F., until it starts to gel. After the composition starts to gel, it is then placed in a high shear test cylinder containing a floating piston with a one quarter inch ball valve opening at one end and the other end capable of being pressurized by nitrogen at about 1500 psi. Thus, the 500 ml sample is placed in the high shear piston cell in front of the floating piston. The cell is then sealed and pressurized with nitrogen at about 1500 psi behind the piston. After the chamber is pressurized, the ball valve is opened and the 500 ml sample is forced through the one quarter inch opening in considerably less than one second which forms a stiff paste substantially instantaneously.

The shear strength of the so-formed paste is measured by noting the distance that a hollow, aluminum cylinder 3.5 inches long × 1.4 inches wide with a wall thickness of 0.06 inches sinks into the paste under the force of various weights after a period of 20 seconds. The shear strength is then calculated from the following expression:

$$\text{Shear strength, Lb/100 ft.}^2 = 3.6 \times \frac{\text{Total wt., grams}}{\text{Penetration distance, inches}}$$

As herein before stated, clays useful in the composition of this invention are hydrophilic, water-swellable clays. This includes those clays which are well known to those skilled in the art as useful in well drilling and well control operations. Particularly preferred are montmorillonite and bentonite clays. Species of these clays include beidellite nontronite, hectorite, and saponite. As a practical matter, cost considerations may dictate that the clays used in this invention will be the sodium montmorillonite or bentonite clays. A commercially available clay that has been found to be useful in this invention is KWK Volclay available from the American Colloid Company. This clay is 90% montmorillonite with about 70–75% of the montmorillonite in the sodium form. Granular clay is preferred to powdered clay. It has been found that the larger the clay particle size used in the shear thickening composition useful in the process of this invention, the longer will be the low shear thickening time and the more clay can be used at a given viscosity without adversely effecting the strength of the paste. In well control processes, the upper limit of the clay particle size will be limited to that which can pass through the holes in the drill bit. For most applications, it will be preferred to use granular clay having a mean particle size below about 60 Tyler mesh and preferably below about 40 mesh. If this invention is to be used for well control purposes, then granular clay should be used and preferably granular clay that has had fines removed. Hydrophobic clays, such as those made by reacting bentonite with one or more long chain hydrocarbon quaternary ammonia compounds, are not included in the scope of this invention.

The continuous, oily phase of the emulsion will be a liquid which is immiscible with water and with the interior aqueous phase of the emulsion. In general, this will comprise any oil or hydrocarbon liquid, typically a mineral oil. Illustrative, but non-limiting examples of oily liquids that have been tried and found to work as the oily phase include paraffinic hydrocarbons such as Low Odor Paraffin solvent (LOPS) and Solvent 100 Neutral (S-100N) available from the Exxon Chemical Company and Exxon Company U.S.A., respectively, as well as paraffinic base oils having an appreciable aromatic content such as Mentor 28 and Mentor 32 which are available from the Exxon Company U.S.A. Further, kerosene and diesel fuel will also work, but not as well as the others. That is, the use of kerosene and diesel fuel will result in a reduction of the low shear thickening time and pumpability of the shear thickening fluid and result in a weaker paste. Further, it should be emphasized again that the exact nature of the oil is not critical as long as it is not miscible with water or with the aqueous internal phase of the emulsion and does not react with the clay or any of the other components of the composition.

The continuous, oily, water immiscible phase of the emulsion must contain one or more oil soluble surfactants for forming and stabilizing the emulsion. Not all surfactants work in the shear thickening composition useful in the process of this invention. Oil soluble surfactants that have been found to be particularly useful in the composition useful in this invention comprise amine and particularly polyamine derivative surfactants such as polyamine derivatives of polyalkenyl succinic anhydrides. These materials are known to those skilled in the art and are taught, for example, in U.S. Pat. No. 3,172,892, the disclosures of which are incorporated herein by reference. Also usful are borated and carboxylated derivatives of these materials such as those disclosed in U.S. Pat. No. 4,173,540 and British Pat. No. 1,018,982, respectively, the disclosures of which are also incorporated herein by reference.

The polyalkenyl succinic anhydrides useful in preparing these surfactants will generally comprise those wherein the polyalkenyl group has a $M_n$, number average molecular weight, of about 700 to 5,000, preferably 900 to 2,000. The methods of preparation are well known in the art, i.e., reaction of maleic anhydride with either the polyolefin itself or with a chlorinated polyolefin which in either case provides the desired polyalkenyl succinic anhydride. Polyisobutylene is preferred but other polymers of $C_3$ or $C_4$ olefins such as polybutene-1 and polypropylene are suitable, including mixtures of such polyolefins. Polyisobutylene succinic anhydride is referred herein as PIBSA.

Preferred alkylene polyamines are also well known and are represented by the formula $NH_2(C_2)_n(NH(CH_2)_n)_m NH_2$, wherein n is 2 to 3 and m is 0 to 10. Illustrative are ethylene, diamine, diethylene triamine, triethylene tetramine, tetraethylene pentamine, pentaethylene hexamine, and the like.

Illustrative, but non-limiting examples of water soluble polymers that will work in this invention for flocculating and congealing the hydrated bentonite include polyacrylamide and polyethylene oxide. Polyacrylamides are preferred, preferably non-ionic or unhydrolyzed polyacrylamides. The molecular weight of the polyacrylamide should be greater than about one million. It has been found that higher molecular weight polyacrylamides impart a more rubbery, elastomeric character to the pastes formed by subjecting the compositions of this invention to relatively high shear. That is, the higher the molecular weight of the water soluble polyacrylamide used in the invention, the greater will be both the shear strength and integrity of the so-formed paste, even in the presence of flowing fluids, such as gas, oil, brine, water, etc.

The amines useful in the composition of this invention must be oil soluble, not water soluble and will preferably be liquid at room temperature. Primary, secondary and tertiary amines have all been found to be useful in this invention. Particularly preferred are di and triamines. Ether amines and polyethoxylated amines have also been found useful in this invention. Certain fatty amines, particularly those derived from 8 to 20 carbon atom hydrocarbon radicals, have been found to be particularly useful in this invention. Fatty amines are amines which are the derivative products of the reaction of ammonia with fatty acids to form nitriles, followed by hydrogenation and/or reductive alkylation to primary, secondary or tertiary amines. The alkyl chains in such fatty amines are generally derived from a variety of fats and oils, including tallow, coconut oil, soybean oil, marine oils, rape seed oil and the like.

The exact amounts of the various components of the shear-thickening composition useful in the process of this invention will vary somewhat depending upon the nature and molecular weight of the amine derivative surfactant, polyacrylamide and oil-soluble amine. The following table, based on 100 parts by weight of 10–60 mesh (Tyler) granular KWK clay, illustrates the general and preferred ranges of the various ingredients to each other of the shear thickening composition of this invention.

|  | Parts by Weight | |
|---|---|---|
|  | General | Preferred |
| granular clay, 10–60 mesh | 100 | 100 |
| water | 25–400 | 100–300 |
| water soluble polymer | 0–10 | 0.1–7 |
| oil | 25–130 | 50–100 |
| surfactant | 5–40 | 15–25 |
| oil soluble amine | 0.1–25 | 0.5–10 |

A number of different methods may be employed to prepare the composition useful in the process of this invention, the precise method used being dictated by the convenience of the user. However, it has been found that the procedure used to make the composition of this invention as it relates to the order of addition of water, clay and amine to the overall fluid composition has been found to have a considerable effect on the ability of the oil soluble amine to extend the thickening time of the composition under low shear forces. It should be noted that the water phase will preferably, but not necessarily comprise an aqueous solution of clay congealing polymer such as a polyacrylamide.

Thus, one may form a dispersion of the clay in a surfactant and amine-containing oil. After this dispersion is formed, the water may be added to the oily dispersion to form a water-in-oil emulsion wherein the water is emulsified in the clay-containing continuous oily phase. In this method, one may mix the oil, surfactant, oil-soluble amine and clay in any order without affecting the performance of the composition of this invention before the water is emulsified into the oily phase. Alternatively, one may form a water-in-oil emulsion in which the aqueous phase is emulsified into a surfactant-containing oil. After this emulsion has been formed, then the oil-soluble amine and clay may be added thereto in any order. Thus, the amine may then be dissolved in the oily phase of the emulsion followed by dispersion of the clay into the oily phase thereof. Alternatively, the clay may be dispersed in the oily phase of the emulsion after which the oil-soluble amine is dissolved in the oily phase thereof. A method that has been found not to work for forming the composition of this invention is where a water-in-oil pre-emulsion is formed wherein the aqueous phase is dispersed in a surfactant and amine-containing continuous oily phase, followed by dispersing the clay in the oily phase of the so-formed emulsion. It has been found that if one tries to form a composition of this invention using this particular method, no improvement in or extension of the low-shear thickening time is achieved.

If one is to use the process of this invention for well control, then as a practical matter it may be preferred to form an emulsion comprising a water-in-oil emulsion wherein the aqueous phase is emulsified in the surfactant containing oil. This emulsion can be prepared anywhere, stored for one or more years and trucked to the well site when same is needed. At the well site, the oil soluble amine will then be dissolved in the oily phase of the emulsion and the clay will be dispersed into said oily phase. Alternatively, the clay may first be dispersed into the oily phase of the emulsion followed by adding the oil soluble amine. This method offers the advantage of not having to form an emulsion at the well site.

If desired, the aqueous phase of the composition useful in the process of this invention may contain one or more low molecular weight alcohols or glycols as antifreezes to prevent the aqueous phase of the emulsion from freezing at low temperatures. This may be particularly desirable if one intends to use the composition of this invention in cold weather. Any of the commonly used antifreezes may be employed in the aqueous phase of the composition of this invention such as methanol, isopropanol, ethylene glycol, propylene glycol, etc. When an antifreeze is employed in the aqueous phase of this emulsion, it will generally be employed in said aqueous phase in an amount broadly ranging from about 10 to 35 wt. % thereof.

DESCRIPTION OF A PREFERRED EMBODIMENT

In a hypothetical, but typical well plugging operation, 100 pounds of American Cyanamid P-250 polyacrylamide will be dissolved into 32 barrels (about 11,200 lbs.) of fresh water using a mixing tank equipped with a recirculating pump. The pump will be equipped with a jet hopper on the inlet side. The polyacrylamide powder will be slowly fed into the hopper and mixed with and into the water being circulated by the pump. In a separate tank, three drums (about 1,314 lbs) of a PIBSA-polyamine derivative surfactant will be dissolved into ten drums (about 3900 lbs) of an oil such as Mentor 28. This oil tank will preferably be equipped with a positive displacement pump having a tee inlet. After the surfactant has been dissolved in the oil, the oily surfactant solution will be circulated through the positive displacement pump. An oil external emulsion or water-in-oil emulsion will then be formed by adding the aqueous polymer solution to the recirculating oil through the tee inlet of the positive displacement pump. The rate of addition of polymer water to the oil will be one volume of aqueous polymer solution added for each three volumes of oily surfactant solution or recirculated emulsion. After all of the polymer solution has been added to and emulsified in the oil, the resulting emulsion will be circulated through the positive displacement pump for about thirty minutes to insure complete emulsification of the aqueous phase into the oily phase. This emulsion may, if convenient be made off-site in advance, stored and then trucked to the well site when needed.

Immediately prior to use at the well site, about eight barrels of the emulsion prepared above will be set aside for use as front and back spacers for the shear thickening fluid. The rest of the emulsion will be placed into a Halliburton ribbon blender. In the Halliburton ribbon blender, 52 lbs. of an oil soluble cocoa amine, such as Adogen 160 from Sherex, will be dissolved into the continuous oily phase of the emulsion followed by 52 sacks (5600 lbs.) of 20–40 Tyler mesh KWK Volclay. While the clay is being dispersed into the continuous oily phase of the emulsion, about 10 barrels of water flush will be pumped into the drill pipe in the well bore, the drill pipe containing circulating drilling mud. This water flush will be followed by four barrels of the emulsion spacer and then by approximately 47 barrels of the shear thickening fluid formed in the Halliburton ribbon blender. The shear thickening fluid will be pumped down into the drill pipe at a rate of about one barrel per minute using a Halliburton pump truck containing a triplex pump. The shear thickening fluid will be followed with four barrels of emulsion as a spacer, with the emulsion spacer followed by drilling mud. Drilling mud will then be used to displace or push the shear thickening fluid through the drill pipe to the zone desired to be plugged in the well bore. The drilling mud will be pumped into the drill pipe at a rate of about three barrels per minute. When the shear thickening fluid reaches the drill bit, the drilling mud will then be pumped into the drill pipe at a rate of about six barrels per minute so that the shear thickening fluid is sheared through the drill bit nozzles at a rate of about six barrels per minute.

The invention will be further understood by reference to the examples below.

EXAMPLE 1

In this example, various types of amines were evaluated in a laboratory screening test to determine their potential suitability for use in this invention. These amines were all commercially available products and were obtained from Sherex, Eastman Kodak and Armak. The clay used was 20–40 mesh (Tyler) KWK Clay obtained from the American Colloid Company and the oil for the oily phase of the water-in-oil emulsion was Solvent 100 Neutral obtained from Exxon Chemical Company. In this test, 5 grams of amine were dissolved in 20 grams of the oil in a 100 cc beaker. Following this, 10 grams of the KWK clay were added to the oil and dispersed using a spatula after which 25 grams of distilled water were added to the dispersion of clay in the amine-containing oil. The water was dispersed into the oil with a spatula at a stirring rate of approximately 100 rpm until all of the water was emulsified in the oily phase. The clay was then checked for initial swelling and checked again after 60 minutes had elapsed. The results of this swelling test are given in Table 1. A "no" in a column means that the clay did not swell and that the amine so tested would probably work in this invention. On the other hand, a "yes" result meant that the clay did swell and that that particular amine would not be a likely candidate for successful use in this invention.

EXAMPLE 2

In this experiment, the influence of various types of amines on the thickening time of the shear-thickening composition of this invention was determined. This test has been correlated with field experience. The shear-thickening composition of this invention was made up employing various types and concentrations of the oil-soluble amine additives. Between 400 and 500 grams of each composition were made and placed in a jacketed, low shear mixing cell for evaluation. This jacketed, low shear mixing cell was a jacketed glass beaker with internal dimensions of approximately three and one-half inches deep and two and one-half inches wide. The beaker was fitted with a Plexiglass cover, through which a hole was drilled to receive the shaft of an egg beater impeller. The egg beater impeller had a diameter of one and a half inches, was two and a quarter inches long and was placed in the beaker so that it just cleared the bottom. Sufficient composition was placed in the beaker so that it just covered the top of the impeller. Hot water was circulated through the jacket of the beaker in order to maintain the contents thereof at a temperature of about 120° C. The egg beater impeller was then rotated at a speed of 500 rpm until the composition started to gel. The point at which the fluid abruptly thickened was defined as the low shear thickening time. This point was quite reproducible and the impeller shaft at this point required an abrupt increase in input of 90 mv in order to maintain the 500 rpm. In most instances the point of low shear thickening was accompanied by an obvious change in the physical appearance of the dispersion.

After the composition had started to gel, it was then placed in a high shear test cylinder containing a floating piston. The cylinder had a one quarter inch ball valve opening at one end and the other end was pressurized by nitrogen at about 1500 psi. Thus, the sample was placed in the high shear piston cell, the floating piston placed behind the sample, the cell was sealed and then pressurized with nitrogen at about 1500 psi behind the piston. After the chamber was pressurized, the ball valve was opened and the sample was forced through the one quarter inch opening in considerably less than one second which formed a stiff paste substantially instantaneously.

The shear strength of the so-formed paste was measured by noting the distance that a hollow, aluminum cylinder 3.5 inches long × 1.4 inches wide with a wall thickness of 0.06 inches sank into the paste under the force of various weights after a period of 20 seconds. The shear strength was than calculated from the following expression:

$$\text{Shear strength, Lb/100 ft.}^2 = 3.6 \times \frac{\text{Total wt., grams}}{\text{Penetration distance, inches}}$$

It should be noted that the shear strength is expressed in pounds per 100 ft.$^2$ as opposed to pounds per ft.$^2$, because 100 ft.$^2$ roughly corresponds to the internal area of a 90 ft. string of drill pipe having an inside diameter of about 3 inches.

The compositions tested were prepared by (a) dissolving the amine derivative surfactant and the oil soluble amine additive into the oil then (b) dispersing the granular clay into the oil phase followed by (c) dispersing the aqueous phase into the oil as an emulsion by hand mixing with a spatula. The oil phase was Solvent 100 Neutral oil containing 11 wt.% of a polyamine derivative surfactant. This surfactant was a borated derivative of the reaction product of polyisobutenyl succinic anhydride and an alkylene polyamine (Dow E-100) which was prepared by condensing 2.1 moles of polyisobutenyl succinic anhydride having a Saponification Number of 112 and a number average molecular wt. ($\overline{M}_n$) of about 900 dissolved in a neutral mineral oil to provide a 50 weight percent solution, with one mole of said alkylene polyamine. The procedure used to prepare this surfactant was the same procedure used in Example 2 of U.S. Pat. No. 4,173,540, the disclosures of which have already been incorporated herein by reference. The aqueous phase of the emulsion comprised a one wt.% solution of American Cyanamid's P-250 polyacrylamide which has a molecular weight roughly of about seven million, said aqueous phase comprising about 48.8 weight percent of the total composition. The granular clay comprised 29.3 wt.% of the total composition and was 20–40 mesh KWK clay obtained from the American Colloid Company. The results of these experiments are disclosed in Table 2. The amount of amine additive is expressed as the wt.% of same of the oil phase of the shear thickening composition.

These results show that the coconut oil diamine provided the best combination of low shear thickening time enhancement as well as high shear strength.

EXAMPLE 3

This experiment was similar to that of Example 2, employing the same apparatus and procedures, except that the effect of the amount of dimethyl dodecyl amine (Armac) was determined using three different methods of preparing the composition of this invention. In the first method, which shall be referred to as Method A, the oil, polyamine derivative surfactant and oil soluble amine additive were first mixed together followed by dispersing the clay therein. After this, the aqueous phase was dispersed and emulsified into the oil. In another method, which shall be referred to as Method B, the oil, polyamine derivative surfactant and oil-soluble amine were mixed together, followed by dispersing the aqueous phase as an emulsion into the oil phase followed by dispersing the clay into the continuous oil phase of the emulsion. In a third method used to prepare the composition of this invention, Method C, the aqueous phase was emulsified into the surfactant-containing oil after which the amine additive was added and dissolved into the continous oil phase of the emulsion. Following addition of the amine additive, the clay was dispersed into the oil phase. The results of these experiments are shown in Table 3.

These results clearly show the beneficial effect of the oil soluble amine additive in extending the low shear thickening time of the shear thickening fluid. They also show that preparation method B did not work.

EXAMPLE 4

This experiment illustrates the effect of the oil soluble amines of this invention on the low shear thickening time of a typical shear thickening well control fluid and serves to characterize its pumpability. This experiment was conducted in a manner similar to that of Example 2. In this experiment, 8 grams of the borated PIBSA-polyamine derivative surfactant were mixed into 71.2 grams of Solvent 100 Neutral oil. After this, 120 grams of 20–40 mesh KWK clay was added and mixed into the oil, stirring with a spatula, until all the clay was thoroughly coated with the oil. This mixture of clay dispersed in the surfactant-containing oil was allowed to stand with occasional stirring for at least five minutes before the aqueous phase was added in order to give the surfactant sufficient time to coat the surface of the clay. In those cases where the oil contained an oil soluble amine such as coco amine or coco diamine, 0.8 grams of the oil soluble amine was dissolved in the oil with the surfactant. 200 grams of water comprising a 1 wt.% solution of American Cyanamid's P-250 polyacrylamide was then added to the oil in three to four aliquots with enough mixing by spatula after each aliquot to make a water-in-oil emulsion.

The shear thickening fluid was then placed in the jacketed, low shear mixing cell for evaluation with the impeller preset at a speed of 500 rpm. Warm water circulating through the jacket of the beaker maintained the contents thereof at a temperature of about 120° C. The point at which the shear thickening fluid abruptly thickened and the impeller motor required an input of 90 mv to maintain the 500 rpm speed was defined as the low shear thickening time. Ordinarily, this point is quite reproducible and accompanied by an obvious change in the physical appearance of the fluid. However, in the case of the compositions containing the amine additives, the visual change was less obvious.

The results of this experiment are shown in the FIGURE and graphically illustrate the beneficial effect of the oil soluble amine additive in extending the low shear thickening time of the shear thickening fluid.

TABLE 1

Results of Pre-Screening Swelling Tests

| AMINES | Swelling Test Results | |
|---|---|---|
| | 0 Minutes | 60 Minutes |
| Primary fatty amines | | |
| soya amines | no | no |
| tall oil amines | no | no |
| oleyl amines | no | no |
| coco amines | no | yes |
| Primary Fatty Ether Amines | | |
| $C_{10}$ ether amines | no | maybe |
| $C_8$–$C_{10}$ ether amines | no | maybe |
| Secondary Fatty Amines | | |
| di-tridecyl amines | no | yes |
| Tertiary Fatty Amines | | |
| tri ($C_8$–$C_{10}$) amines | no | yes |
| di-coco methyl amines | no | yes |
| tri (isooctyl) amines | yes | yes |
| tri (tridecyl) amines | yes | yes |
| N,N dimethyl dodecyl amines | no | no |
| Tertiary polyethoxylated amines | | |
| bis (2-hydroxyethyl) coco amines | no | no |
| polyoxyethylene (5) coco amines | yes | yes |
| polyoxyethylene (10) coco amines | yes | yes |
| polyoxethylene (15) coco amines | yes | yes |

TABLE 1-continued

Results of Pre-Screening Swelling Tests

| AMINES | Swelling Test Results | |
|---|---|---|
| | 0 Minutes | 60 Minutes |
| polyoxethylene (10) octadecyl amines | yes | yes |
| polyoxyethylene (15) octadecy amines | yes | yes |
| Fatty Diamines | | |
| tall oil amines | no | no |
| coco diamines | no | no |
| oleyl diamines | no | maybe |
| Fatty Ether Diamines | | |
| tridecyl ether diamines | no | yes |
| Fatty Triamines | | |
| 4-dodecyl diethylene triamine | no | no |
| Polyisobutylene-polyamine surfactant | yes | yes |

TABLE 2

EFFECT OF AMINE TYPE ON LOW SHEAR THICKENING TIME

| Type | AMINE Wt. % of oily phase | LOW SHEAR THICKENING TIME, Min. | THICKENING TIME ENHANCEMENT | HIGH SHEAR STRENGTH, LB/100 ft$^2$ |
|---|---|---|---|---|
| | None | 30 | — | 14,000 |
| 2-EHA | 0.1 | 25 | 0.8 | — |
| 2-EHA | 1 | 15 | 0.5 | — |
| SA | 1 | 35.7 | 1.2 | 14,000 |
| SA | 5 | 24.5 | 0.8 | 5,100 |
| OA | 1 | 35.4 | 1.2 | — |
| CA | 1 | 46.1 | 1.4 | — |
| ODA | 1 | 42.8 | 1.4 | 12,600 |
| 4DDTA | 1 | 55.3 | 1.8 | 9,700 |
| 4DDTA | 2 | 56.3 | 1.9 | 7,200 |
| CDA | 1 | 58.1 | 1.9 | 12,000 |
| CDA | 1 | 56.2 | 1.9 | 14,400 |
| CTA | 1 | 60.0 | 2.0 | — |

TABLE 2A

AMINES USED IN EXAMPLE 2

| 2EHA | 2-ETHYLHEXYL AMINE |
|---|---|
| SA | SOYA AMINE |
| OA | OLEYL AMINE |
| CA | COCO AMINE |
| ODA | OLEYL DIAMINE |
| CDA | COCO DIAMINE |
| 4DDTA | 4-DODECYL DIETHYLENE TRIAMINE |
| CTA | COCO TRIAMINE |

TABLE 3

PREPARATION METHOD EFFECT ON LOW SHEAR THICKENING TIME

| WT. % AMINE IN OIL PHASE | MIXING METHOD | LOW SHEAR THICKENING TIME | THICKENING TIME ENHANCEMENT | HIGH SHEAR STRENGTH, (LB/100 FT$^2$) |
|---|---|---|---|---|
| — | A | 30 | — | 14,000 |
| 0.1 | A | 33.7 | 1.1 | — |
| 1 | A | 43 | 1.4 | 11,500 |
| 5 | A | 40.5 | 1.35 | 14,000 |
| 10 | A | 37.7 | 1.25 | 9,000 |
| — | B | 32.2 | — | 11,800 |
| 0.1 | B | 34.3 | NONE | 8,400 |
| 2 | B | 33.3 | NONE | 14,000 |
| 5 | B | 31.7 | NONE | 14,900 |
| 5 | C | 39.9 | 1.25 | 14,400 |

What is claimed is:

1. A process for plugging a porous earth formation which comprises contacting said formation with a shear thickening composition which comprises a water-in-oil emulsion having particles of hydratable, water-expandable clay dispersed in the continuous oily phase thereof, said oily phase having both a surfactant and an oil soluble amine dissolved therein, said composition having a greater low shear thickening time than the same composition free of the oil soluble amine dissolved in the oily phase, and wherein said contacting occurs under conditions of high shear sufficient to form a paste from said composition which plugs said porous formation.

2. The process of claim 1 wherein said oil soluble amine is liquid at room temperature.

3. The process of claim 2 wherein said clay is granular.

4. The process of claim 3 wherein said conditions of high shear comprise shear rates of at least about 2,000 sec.-1.

5. The process of claim 4 wherein said shear-thickening composition comprises, on a parts by weight basis, 100 parts of clay, from about 25 to 130 parts of oil, from about 25 to 400 parts of aqueous phase, from about between 0.1 to 25 parts of oil soluble amine, and from about 5 to about 40 parts of surfactant.

6. The process of claim 5 wherein said surfactant comprises an amine derivative surfactant.

7. The process of claim 6 wherein said clay comprises bentonite.

8. The process of claim 7 wherein said surfactant comprises a polyamine derivative surfactant.

9. The process of claim 8 wherein said oil soluble amine is a di or triamine.

10. The process of claim 9 wherein said shear rates which form said paste are at least about 10,000 sec.$^{-1}$.

11. The process of claim 10 wherein said granular clay has an average particle size below about 60 Tyler mesh.

12. The process of either of claims 10 or 11 wherein said emulsified aqueous phase contains a water soluble polymer dissolved therein which flocculates and congels the clay when same is mixed with said aqueous phase under said conditions of high shear.

13. The process of claim 12 wherein said shear forces broadly range from between about 10,000 to 1,000,000 sec.$^{-1}$.

14. The process of claim 13 wherein said surfactant comprises an alkylene polyamine derivative of a polyisobutylene succinic anhydride.

15. The process of claim 14 wherein said oil soluble amine comprises a fatty amine.

16. The process of claim 15 wherein said clay has had the fines removed.

17. A process for plugging an underground formation penetrated by a well which comprises transporting a shear thickening fluid to said formation, under conditions of relatively low shear, through a conduit extending into said well and then subjecting the shear thickening fluid to conditions of relatively high shear at that point of the formation desired to be plugged to form a paste which plugs said formation, wherein said shear thickening fluid comprises a water-in-oil emulsion having particles of hydratable, water-expendable clay dispersed in the continuous oily phase thereof, said oily phase having both a surfactant and an oil soluble amine dissolved therein, said composition having a greater low shear thickening time than the same composition free of the oil soluble amine dissolved in the oily phase.

18. The process of claim 17 wherein said low shear conditions comprise shear rates of less than about 100 sec.$^{-1}$.

19. The process of claim 18 wherein said high shear conditions comprise shear rates of at least about 2,000 sec.$^{-1}$.

20. The process of claim 19 wherein said oil soluble amine is liquid at room temperature.

21. The process of claim 20 wherein said shear thickening composition comprises, on a parts by weight basis, 100 parts of clay, from about 25 to 400 parts of water, from about 0 to 10 parts of water soluble polymer, from about 25 to 130 parts of oil, from about 5 to 40 parts of surfactant and from about 0.1 to 25 parts of oil soluble amine.

22. The process of claim 21 wherein said clay is granular.

23. The process of claim 22 wherein said oily phase comprises a hydrocarbon liquid.

24. The process of either of claims 22 or 23 wherein said aqueous phase has dissolved therein a water soluble polymer for flocculating and congealing said clay when said aqueous phase and clay are mixed under said conditions of high shear to form said paste.

25. The process of claim 24 wherein said surfactant comprises an alkylene polyamine derivative of a polyalkenyl succinic anhydride.

26. The process of claim 25 wherein said oil soluble amine is a di or triamine.

27. The process of claim 26 wherein said clay particles have an average size below about 60 Tyler mesh.

28. The process of claim 27 wherein said high shear conditions include shear stresses of between about 10,000 to 1,000,000 sec.$^{-1}$.

29. The process of claim 28 wherein said clay comprises bentonite.

30. The process of claim 29 wherein said water soluble polymer comprises a polyacrylamide.

31. A process for plugging a portion of a well bore which comprises pumping into said well, under conditions of low shear of less than about 100 sec.$^{-1}$ to the vicinity of said well bore desired to be plugged, a shear-thickening composition which comprises a water-in-oil emulsion having granular particles of hydratable, water-expandable clay dispersed in the continuous oily phase thereof, said oily phase comprising a hydrocarbon liquid having dissolved therein both a surfactant and an oil soluble amine wherein said composition has a greater low shear thickening time that the same composition free of the oil soluble amine dissolved in the oily phase, and subjecting said shear thickening composition to relatively high shear conditions of at least about 2,000 sec.$^{-1}$ at the desired location of said well bore to mix the clay and aqueous phase of said shear-thickening fluid to form a paste which plugs said portion of said well bore.

32. The process of claim 31 wherein said shear thickening composition comprises, on a parts by weight basis, 100 parts of clay, from about 25 to 400 parts of water, from about 0 to 10 parts of water soluble polymer, from about 25 to 130 parts of oil, from about 5 to 40 parts of surfactant and from about 0.1 to 25 parts of oil soluble amine.

33. The process of claim 32 wherein said oil soluble amine is a di or triamine.

34. The process of claim 33 wherein said surfactant comprises a polyamine derivative of a polyalkenyl succinic anhydride.

35. The process of claim 34 wherein said aqueous phase of said emulsion comprises an aqueous solution of a polyacrylamide.

36. A process for plugging a portion of a well bore using a shear thickening composition and an emulsion spacer wherein a conduit, which contains a fluid, extends down into the well bore from the surface thereof at least to the portion of said well bore desired to be plugged and wherein said shear thickening composition comprises a water-in-oil emulsion having particles of hydratable, water expandable clay dispersed in the continuous oily phase thereof, said oily phase comprising a hydrocarbon liquid having both a surfactant and an oil soluble amine dissolved therein, said composition having a greater low shear thickening time than the same composition free of the oil soluble amine dissolved in the oily phase, and said spacer comprising a water-in-oil emulsion wherein the continuous oily phase thereof comprises a hydrocarbon liquid having a surfactant dissolved therein, said process comprising the steps of:

(a) positioning the bottom of said conduit to the location of said well bore desired to be plugged;
(b) pumping a first portion of said spacer emulsion into said fluid containing conduit;
(c) pumping said shear thickening composition into said conduit so that said shear thickening composition contacts said spacer emulsion in said conduit;
(d) pumping a second portion of said spacer emulsion into said conduit so that it contacts said shear thickening composition;
(e) pumping a displacing fluid into said conduit so that it contacts said second portion of said spacer emulsion and displaces said shear thickening composition at a relatively low shear rate to the bottom of said conduit; and
(f) increasing the pumping rate of said displacing fluid into said conduit to force said shear thickening composition out of said conduit under conditions of shear of at least about 2,000 sec$^{-1}$ to form a paste and plug said well bore.

37. The process of claim 36 wherein the high shear mixing comprises passing said shear-thickening composition through orifices or nozzles appurtenant to said drill pipe.

38. The process of claim 37 wherein said nozzles or orifices are the nozzles or orifices of a drill bit at the end of said drill pipe.

39. The process of either of claims 37 or 38 wherein said paste is formed at a distance greater than about 8,000 feet down said well bore.

40. The process of claim 39 wherein said surfactant comprises an alkylene polyamine derivative of a polyalkenyl succinic anhydride.

41. The process of claim 40 wherein said oil soluble amine is a di or triamine.

42. The process of claim 41 wherein said clay comprises bentonite.

43. The process of claim 42 wherein said water soluble polymer comprises a polyacrylamide.

* * * * *